G. E. CADWELL & N. E. STUDEBAKER.
HAY RAKE AND LOADER.
APPLICATION FILED SEPT. 29, 1908.
937,283.
Patented Oct. 19, 1909.
3 SHEETS—SHEET 2.
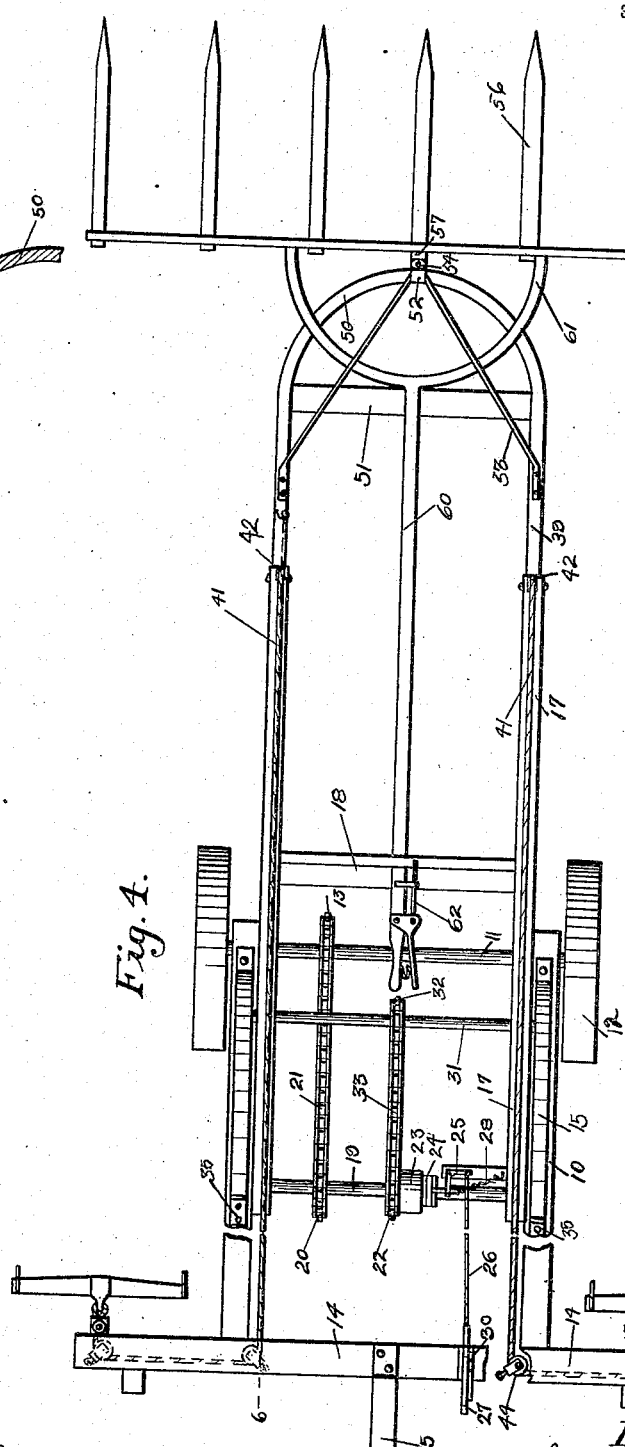
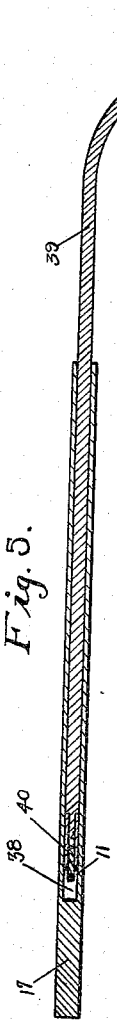
Witnesses
F. C. Caswell
A. G. Hague
Inventor
George E. Cadwell
N. E. Studebaker
by Onwig & Lane Atty's

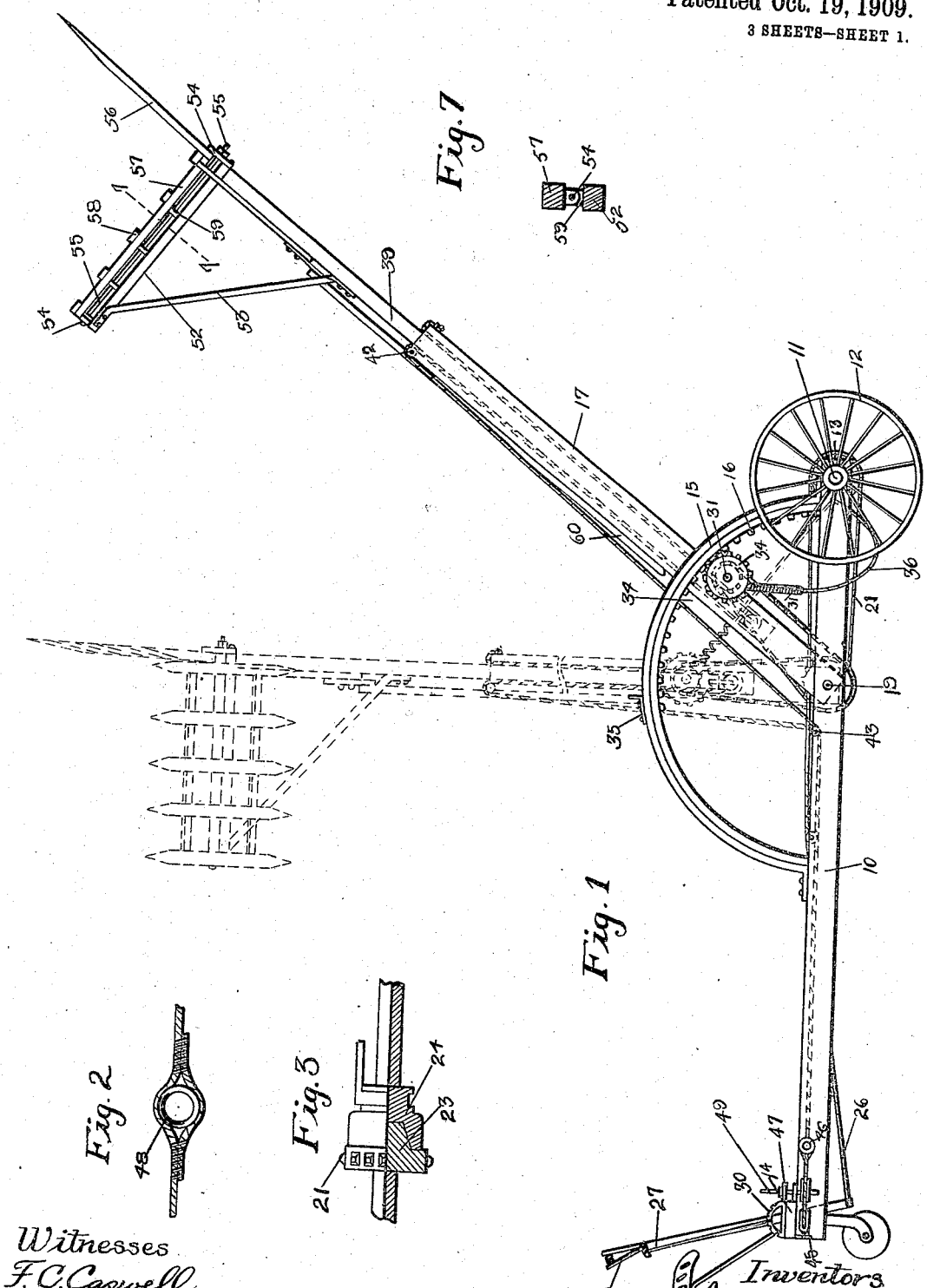

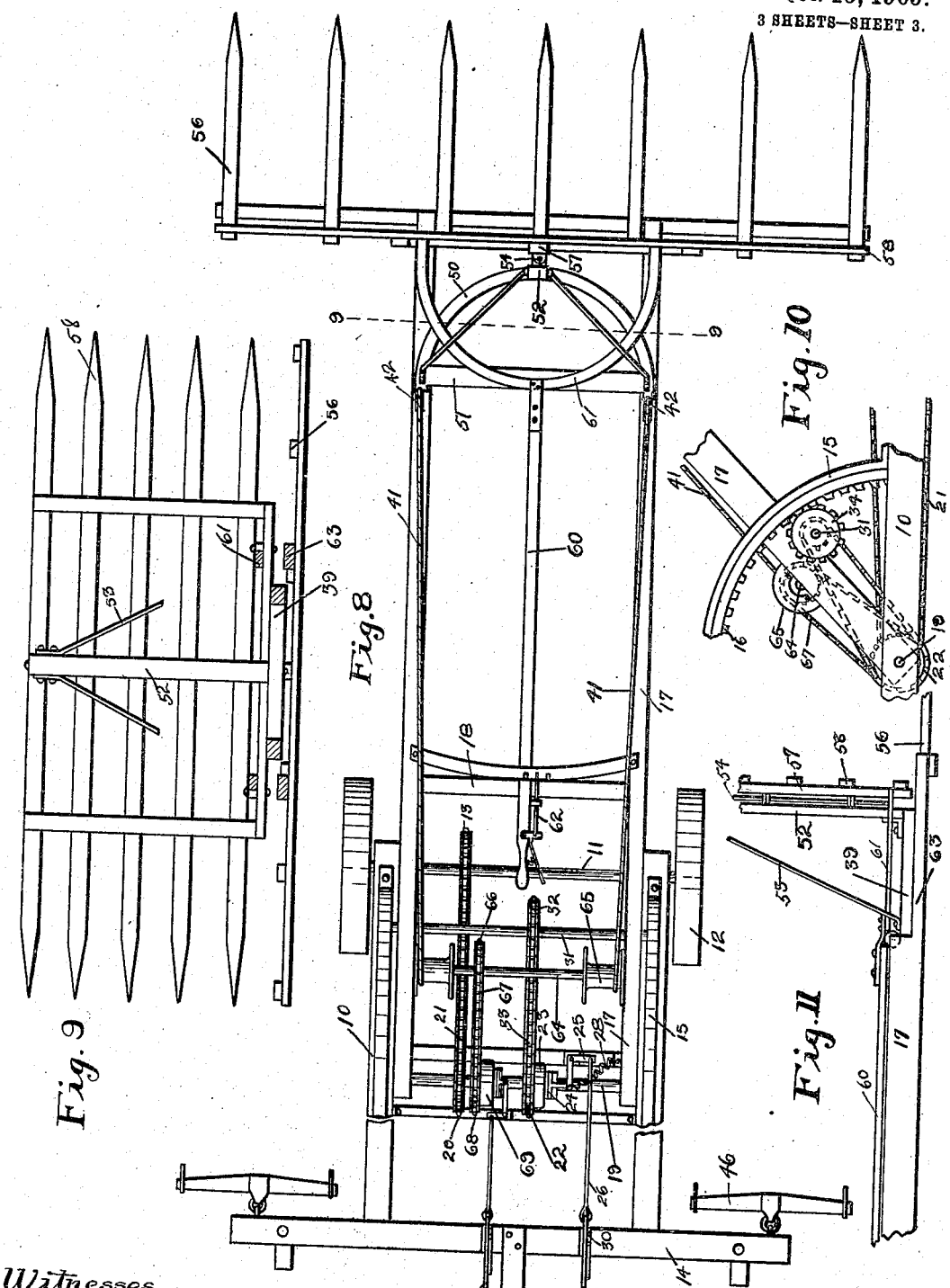

UNITED STATES PATENT OFFICE.

GEORGE E. CADWELL AND NOAH E. STUDEBAKER, OF WINFIELD, KANSAS.

HAY RAKE AND LOADER.

937,283.  Specification of Letters Patent.  Patented Oct. 19, 1909.

Application filed September 29, 1908. Serial No. 455,267.

*To all whom it may concern:*

Be it known that we, GEORGE E. CADWELL and NOAH E. STUDEBAKER, citizens of the United States, residing at Winfield, in the county of Cowley and State of Kansas, have invented a certain new and useful Hay Rake and Loader, of which the following is a specification.

The object of our invention is to provide a combined hay rake and loader of simple, durable and inexpensive construction of the class that is designed to be advanced over a field by draft animals to rake up a quantity of hay and then to be advanced to a hay wagon or stack for the purpose of delivering the hay in any desired position on the wagon or stack.

More specifically, it is our object to provide means by which the hay rake containing a quantity of hay may be raised to a substantially vertical position by power derived from the movement of the machine over a field.

A further object is to provide means whereby a hay rake may be raised to any desired point of elevation with its load after the machine has been advanced to the point where it is desired to discharge the load, and to do this work of elevating the load by means of power supplied by the draft animals, or by means of a motor or other applied power.

A further object is to provide an improved dumping rake so arranged that the load may be discharged on either side of the rake, so that the machine need not be turned around after being advanced to either side of a hay wagon or stack.

Our invention consists in the construction, arrangement and combination of the various parts of the device whereby the objects contemplated are attained, as hereinafter more fully set forth, pointed out in our claims, and illustrated in the accompanying drawings, in which—

Figure 1 shows a side elevation of a hay rake and loader embodying our invention, the hay rake being shown at an angle of about forty-five degrees, and by dotted lines in a position for discharging its contents. Fig. 2 shows a detail view illustrating the means for detachably securing the rope or cable to which the swingle-trees are attached. Fig. 3 shows an enlarged, detail view partly in section of the friction clutch device for controlling the up and down movement of the hay rake supporting arms. Fig. 4 shows a top or plan view of the device embodying our invention with the rake in a lowered position. Fig. 5 shows a sectional view of the rake supporting arms to illustrate the telescopic connection between the parts thereof. Fig. 6 shows a similar view taken at right-angles to the view shown in Fig. 5. Fig. 7 shows an enlarged, detail, sectional view on the line 7—7 of Fig. 1. Fig. 8 shows a top or plan view of a modified form of the device embodying our invention. Fig. 9 shows an enlarged, sectional view on the line 9—9 of Fig. 8, looking toward the hay platform. Fig. 10 shows a detail side view illustrating a modified form of the gearing devices for raising and lowering the rake supporting arms, and also for raising and lowering the hay platform, and Fig. 11 shows a detail side view illustrating the means for raising and lowering the hay platform relative to the hay rake supporting arms.

Referring to the accompanying drawings, we have used the reference numeral 10 to indicate the frame of the device. At the forward end of the frame is a rotatable axle 11, having the traction wheels 12 fixed to its ends and the sprocket wheel 13 fixed to its central portion. At the opposite end of the frame is a cross beam 14 to which the driver's or operator's seat is attached. This cross beam extends beyond the sides of the frame for the purpose of connecting the swingle-trees as will hereinafter appear. Mounted upon the sides of the frame near the forward ends are two semi-circular guides 15 having on their end surfaces the cog teeth 16.

Pivoted to the sides of the frame 10 are the hay fork supporting arms 17, connected by a cross piece 18.

Mounted in the frame 10 at the pivotal point of the arm 17, is a shaft 19 having a sprocket wheel 20 fixed thereon connected by means of a chain 21 with the sprocket wheel 13 of the driving axle. Fixed to the same shaft is a sprocket wheel 22 having a tapered hub 23 designed to co-act with a tapered friction clutch member 24 slidingly mounted upon the same axle. This clutch member is controlled by means of a bell crank lever 25 connected by a cable 26 with the lever 27 and a spring 28 is provided for normally holding the sliding clutch member 24 away from the tapered hub 23, and the clutch members are held in engagement with each other only when the operator pulls upon the lever 27.

A spring actuated pawl 29 is connected with said lever and designed to engage a sector 30, so that the lever may be held in its rearwardly inclined position for holding the clutch members in engagement with each other.

Mounted in the arms 17, is a shaft 31 having a sprocket wheel 32 thereon connected by means of a chain 33 with the sprocket wheel 22. On each end of the shaft 31 is a pinion 34 in mesh with the cog teeth 16 and on top of the guides 15 is a stop 35 for limiting the movement of the arms 17. In this connection, we also provide a limiting rope 36 attached to the frame 10 and to the arms 17, which rope is provided with a spring 37 to start the arms 17 on their return movement.

Each of the arms 17 is provided with a longitudinal opening 38 designed to receive the extension members 39 of the rake arms. Each extension member 39 is provided at its lower end with a pulley 40, and on each arm is a cable 41 fixed to the arm 17, extended down through the opening 38 therein, and around the pulley 40 and then up through the opening and around a pulley 42, and then rearwardly under the direction pulley 43, then in the rear of a direction pulley 44, then outwardly toward the end of the cross piece 14 to another direction pulley 45, and then forwardly where it is attached to the swingle-tree 46.

In front of the cross piece 14 is an extension 47, and formed in the cable 41 is an eye 48, said extension 47 being designed to receive a pin 49 to pass through it and through the eye 48, to thereby hold the swingle-tree 46 in position adjacent to the cross piece 14. Obviously, by removing the pin 49, the draft animal attached to the swingle-tree 46 may be advanced without moving the machine, and when so advanced, the cable 41 will cause the extension arms 39 to be elevated relative to the arms 17.

The outer ends of the extension arms 39 are united by means of a curved end piece 50 and the cross brace 51. Fixed to the central portion of the part 50, is a post 52 supported by the brace 53. Connected with this post at both ends are the plates 54 through which a pivot rod 55 is passed.

The hay rake comprises a series of longitudinal tines 56 having at their rear ends the platform bars 57. At right-angles to the tines 56 and fixed to these bars 57 are the hay platform bars 58 extended transversely of the hay rake. The central one of the bars 57 is provided with a number of loops 59 designed to encircle the rod 55 to thereby pivotally connect the hay rake and the hay platform with the pivot rod 55.

We have provided for rigidly supporting the hay rake and platform relative to the hay rake supporting arms by means of a lever 60 having a fork 61 at its outer end attached to the hay platform and having at its inner end a spring actuated pawl 62 designed to enter and engage in the cross piece 18. When this spring actuated pawl is released, the operator may, by grasping the lever 60, cause the hay platform to dump in either direction.

In practical use and assuming that the hay rake is in position adjacent to the ground, and assuming further that draft animals are connected to the swingle-tree 46, then when said draft animals are advanced, a load of hay will be raked up upon the tines 56. When this is done, the operator grasps the lever 27 and moves the clutch device 24 into frictional engagement with the sprocket wheel 21. Then as the draft animals are further advanced, the arms 27 together with the hay rake will be elevated by means of the sprocket gearing device, and the pinion 34 and cog teeth 16, until the hay rake assumes a vertical position, as shown by dotted lines in Fig. 1, where it will be held by the stop 35. When in said vertical position, the weight of the load of hay will rest upon the hay platform bars 58. The machine is then advanced in this position to either side of a wagon or hay stack, then if the hay platform is not high enough, the operator releases the pins 49 and causes the draft animals to be advanced, thus elevating the extension arms 39 and the load of hay to the desired point. When this is done, he grasps the lever 60 and tilts it toward the side opposite from the wagon or stack. This will cause the hay platform and the hay rake to tilt and discharge its load to the desired side. When the load has been discharged, the hay rake and platform are returned to proper position and the spring actuated pawl 62 is placed in engagement with the cross piece 18, then the draft animals are backed until the extension arms are in their normal position and then the pins 49 are again placed in position. Then the clutch device 24 is released from the sprocket wheel 21 and the arms 17 are started on their return movement by the spring 37 and the return movement is completed by gravity, whereupon the hay rake is again in position to rake up hay.

In the modified form illustrated in Figs. 8, 9, 10 and 11, we have shown the arms 17 provided with fixed extensions 63 to which the rake teeth 56 are permanently connected. The extension arms 39 are connected with the arms 17 in the same way as described heretofore, and the upright 52 is connected with the extension arms in the same manner as before described. The hay platform is pivotally connected with the upright 52 and is capable of being tilted by the lever 60.

By the arrangement just described, it is obvious that the rake will be more firmly supported than it is in the form of the invention previously described, and when the rake is in a vertical position, the weight of the hay rests upon the platform, and this platform may then be moved vertically independently of the rake and when so moved it will carry the hay with it, and when at any desired point of elevation the hay platform may be tilted to discharge its load.

We have also provided means for operating the extension arms by power from the traction wheels or from any other suitable source, such for instance, as a motor, as follows: The numeral 64 indicates a shaft mounted on the arms 17 and provided with drums 65 upon which the ropes or cables 41 are wound. This shaft is provided with a sprocket wheel 66 connected by a sprocket chain 67 with a sprocket wheel 68 on the shaft 19. A clutch device 69 is provided for the sprocket wheel 68 and is operated by a lever 70; said clutch device and its operating lever are substantially similar to the clutch device used in connection with the sprocket wheel 22 on the same shaft. In other respects the modified form is substantially the same as the preferred form previously described.

We claim as our invention.

1. In a device of the class described, supporting arms, means for elevating them, a hay rake, a platform pivotally connected to the arms to be capable of swinging laterally relative to the arms to discharge its load at one side of the arms.

2. In a device of the class described, supporting arms, means for elevating the arms, and a hay platform and rake pivotally connected to the arms to discharge laterally in either direction.

3. In a device of the class described, supporting arms, a hay rake and a hay platform arranged at an angle relative to each other, the platform and rake being pivotally connected to the arms to swing laterally, and to discharge in either direction.

4. In a device of the class described, supporting arms, a hay rake and a hay platform arranged at an angle relative to each other, the platform and rake being pivotally connected to the arms to swing laterally, and to discharge in either direction, said hay platform comprising bars arranged transversely relative to the hay rake.

5. In a device of the class described, rake supporting arms, an upright supported at the outer ends of said arms and at right-angles to them, a hay rake and hay platform pivotally connected to said upright to swing laterally, a lever connected to the hay rake, and means for securing said lever in position for supporting the hay rake and platform at the center of their movement relative to the hay rake supporting arms.

6. In a device of the class described, the combination of a frame, supporting wheels for the frame, segmental racks fixed to the frame, hay rake supporting arms pivoted to the frame, a hay rake at the outer end of the supporting arms, pinions carried by the hay rake supporting arms to mesh with the said racks, and means actuated from a supporting wheel for turning the pinions to elevate the hay rake supporting arms.

7. In a device of the class described, the combination of a frame, supporting wheels for the frame, segmental racks fixed to the frame, hay rake supporting arms pivoted to the frame, a hay rake at the outer end of the supporting arms, pinions carried by the hay rake supporting arms to mesh with the said racks, and means actuated from a supporting wheel for turning the pinions to elevate the hay rake supporting arms, and a manually operated clutch device for throwing said pinions into or out of gear with the means for rotating them.

8. In a device of the class described, the combination of a frame, two arms pivoted to the frame, two extension arms telescopically connected with the first, a hay rake supported by the extension arms, a rope or cable for each of said arms, each attached at one end to the arm and then extended under the extension arm, then over the arm, and having an eye connected with its other end, a swingle tree attached to said other end, direction pulleys for guiding said cables, and means co-acting with said eyes for securing the swingle-trees to the frame, said frame and swingle-trees being so arranged that draft animals attached thereto may advance the frame over the ground surface.

9. In a device of the class described, the combination of a frame, supporting wheels for it, swingle-trees arranged at the sides of the frame, two hay rake supporting arms pivoted to the frame, a shaft connected to said arms, pinions fixed to the shaft, two segmental rack bars fixed to the frame and in mesh with said pinions, means operated by a supporting wheel for rotating the pinions, a clutch device for throwing said pinions into and out of gear with the supporting wheel, and a spring arranged to move the hay rake supporting bars from a vertical position to the position required for use.

Des Moines, Iowa, May 20, 1908.

GEORGE E. CADWELL.
NOAH E. STUDEBAKER.

Witnesses for George E. Cadwell:
J. C. PAGE,
W. W. HARRIS.
Witnesses for Noah E. Studebaker:
VANNEETAH ALBERTY,
LAWRENCE DILLMAN.